(12) United States Patent
Chujoh

(10) Patent No.: US 7,856,053 B2
(45) Date of Patent: Dec. 21, 2010

(54) IMAGE CODING CONTROL METHOD AND DEVICE

(75) Inventor: Takeshi Chujoh, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1401 days.

(21) Appl. No.: 11/305,348

(22) Filed: Dec. 19, 2005

(65) Prior Publication Data

US 2006/0133481 A1 Jun. 22, 2006

(30) Foreign Application Priority Data

Dec. 22, 2004 (JP) .............................. 2004-372357

(51) Int. Cl.
*H04N 7/12* (2006.01)
(52) U.S. Cl. ............................ 375/240.01; 375/240.02; 375/240.03; 375/240.24
(58) Field of Classification Search .................. 375/240, 375/240.1; 704/200.1; 709/247; 382/232
See application file for complete search history.

(56) References Cited

U.S. PATENT DOCUMENTS

| | | | |
|---|---|---|---|
| 5,694,173 A | 12/1997 | Kimura et al. | |
| 5,778,192 A * | 7/1998 | Schuster et al. | 375/240.2 |
| 5,978,544 A | 11/1999 | Shimada et al. | |
| 6,711,295 B2 | 3/2004 | Nakayama et al. | |
| 6,876,703 B2 * | 4/2005 | Ismaeil et al. | 375/240.16 |
| 6,947,886 B2 * | 9/2005 | Rose et al. | 704/200.1 |
| 7,023,922 B1 * | 4/2006 | Xu et al. | 375/240.19 |
| 7,502,517 B2 | 3/2009 | Kodama et al. | |
| 7,792,193 B2 | 9/2010 | Tanizawa et al. | |
| 2004/0105497 A1 | 6/2004 | Takakura et al. | |
| 2005/0100229 A1 * | 5/2005 | Becker et al. | 382/232 |
| 2006/0098733 A1 | 5/2006 | Matsumura et al. | |

FOREIGN PATENT DOCUMENTS

JP 2004-128749 4/2004

OTHER PUBLICATIONS

Joint Video Team of ISO/IEC MPEG & ITU-T VCEG, 12$^{th}$ Meeting: Redmond, WA, "JVT-L047d8," Jul. 2004, pp. i-123.
ISO/IEC 13818-2, Information technology—Generic coding of moving pictures and associated audio information: Video, chap. 7, sec. 4, "Inverse quantisation," Second edition Dec. 15, 2000.

(Continued)

*Primary Examiner*—King Y Poon
*Assistant Examiner*—Akwasi M Sarpong
(74) *Attorney, Agent, or Firm*—Nixon & Vanderhye, PC

(57) ABSTRACT

Image coding having high coding efficiency is provided with a small computational complexity by properly determining a prediction mode and a quantization parameter. When an image is coded by a prediction mode selected from plural prediction modes every any coding unit, an undetermined multiplier $\lambda$ is first calculated from a quantization parameter (function S301). Subsequently, the cost of each of R-D points (pairs of number of coded bits and coding distortion that correspond to plural combinations of prediction modes and quantization parameters) is calculated (function S305) on the basis of the undetermined multiplier $\lambda$ while generation and estimation of the R-D points and deletion of the points (functions S302-S304) are repeated every coding unit, for example, every macroblock, and the optimal combination of the prediction mode and the quantization parameter is determined on the basis of the R-D point providing the minimum cost.

8 Claims, 7 Drawing Sheets

OTHER PUBLICATIONS

Wedi et al., "Quantization with an Adaptive Dead Zone Size for H.264/AVC FRExt", JVT of ISO/IEC MPEG & ITU-T VCEG, Document JVT-K026, Mar. 2004.

Wiegand et al., *Rate-Constrained Coder Control and Comparison of Video Coding Standards*, IEEE 2003.

Sullivan, "Adaptive quantization encoding technique using an equal expected-value rule", JVT of ISO/IEC MPEG & ITU-T VCEG, Document JVT-N011, Jan. 2005.

ITU—Telecommunications Standardization Sector, Study Group 16, *Video Codec Test Model; Near-Term, Version 9 (TMN9)*, Document Q15-C-15, title page, contents (2 pages), pp. 1-18.

Sullivan et al.; *Rate-Distortion Optimization for Video Compression*, IEEE Signal Processing Magazine, vol. 15, No. 6, pp. 74-90, Nov. 1998.

U.S. Appl. No. 11/268,721 filed Nov. 8, 2005.

Japanese Application No. 2004-177190 filed Jun. 15, 2004.

* cited by examiner

IMAGE CODING CONTROL METHOD AND DEVICE

CROSS-REFERENCE TO RELATED APPLICATIONS

This application is based upon and claims the benefit of priority from the prior Japanese Patent Application No. 2004-372357, filed on Dec. 23, 2004; the entire contents of which are incorporated herein by reference.

TECHNICAL FIELD

The present invention relates image coding control method and device for motion pictures or still images.

BACKGROUND OF THE INVENTION

According to a motion picture coding standard system such as ITU-T H.261, H.263, H.264, ISO/IEC MPEG-2, MPEG-4 part 2 or the like, coding is carried out every coding unit called as a macroblock while switching a prediction mode. It is said that it greatly affects the coding performance how the switching operation is carried out.

One of the methods of switching the prediction mode is disclosed in TMN9 which is a test model of ITU-T H.263 (see Non-patent Document 1, ITU-T, Study Group 16: "Video Codec Test Model, Near-term, Version 9 (TMN9)", Document: Q15-C-15, 1997) In the Non-patent Document 1, threshold value processing is carried out by using the absolute value difference sum between an input picture and a predictive picture achieved by motion compensation, and the absolute value difference sum between the input picture and the macroblock of the input picture, whereby three prediction modes of an inter-frame prediction mode of 8×8 blocks, an inter-frame prediction mode of 16×16 blocks and an intra-frame prediction mode are switched to one another.

Furthermore, a method of selecting the prediction mode of each macroblock on the basis of Lagrange's undetermined multiplier method is introduced in a non-patent document 2 (Gary J. Sullivan and Thomas Wiegand, "Rate-Distortion Optimization for Video Compression", IEEE Signal Processing Magazine, Vol. 15, No. 6, pp 74-90, November 1998). More specifically, coding is actually carried out in each prediction mode to determine a number of coded bits (rate) and a coding distortion. Thereafter, the cost of each prediction mode to the same quantization parameter is calculated under the condition that the Lagrange's undetermined multiplier is assumed as the function of the quantization parameter, and the prediction mode in which the cost is minimum is selected. This publication reports that the coding efficiency is more greatly enhanced as compared with TMN9 by this method.

The switching method of the prediction mode disclosed in the non-patent document 1 is an easy method, and the switching operation of the prediction mode can be performed with small computational complexity. However, this method pays no attention to the actual number of coded bits (rate) and the distortion, and thus it can be hardly said that the switching operation of the prediction mode which is optimal in the relationship between the number of coded bits and the distortion is carried out. Accordingly, this method does not greatly enhance the coding efficiency.

According to the method disclosed in the non-patent document 2, a number of coded bits-a coding distortion function having the same gradient with respect to the same quantization parameter is assumed. Therefore, when the quantization parameter is varied or when the shape of the number of coded bits-coding distortion function is different from the assumed shape, it is impossible to carry out accurate comparison estimation on the coding cost, and thus a proper prediction mode cannot be selected. Furthermore, it is also impossible to compare the coding cost when the quantization parameter is varied under the combination with the number of coded bits control. Accordingly, it cannot be expected that the coding efficient is greatly enhanced by this method.

Therefore, Japanese Patent Application No. 2004-177190 discloses a method of selecting not only an optimal prediction mode, but also an optimal quantization parameter. According to this method, not only the prediction mode of each macroblock, but also the value of the quantization parameter is varied to calculate the cost, and the prediction mode and the quantization parameter that provides the minimum cost are selected. This method more greatly enhances the coding efficiency as compared with the non-patent document 2. However, the frequency at which the coding is actually carried out by using each prediction mode and each quantization parameter is large, and thus the computational complexity may be increased.

Therefore, an object of the invention is to provide image coding control method and device in which image coding having high coding efficiency can be carried out with a small computational complexity by properly determining a prediction mode and a quantization parameter.

BRIEF SUMMARY OF THE INVENTION

According to embodiments of the invention, an image coding control method for controlling a quantization parameter by using one prediction mode selected from plural prediction mode every any coding unit, comprises: calculating an undetermined multiplier corresponding to a parameter used for a cost function from a given reference quantization parameter; selecting a set of secondary number of coded bits-coding distortion pairs from a set of primary number of coded bits-coding distortion pairs that correspond to plural combinations of the prediction mode and the quantization parameter every coding unit; selecting number of coded bits-coding distortion pairs providing the minimum cost function minimum as the optimal number of coded bits-coding distortion pairs from the set of the secondary number of coded bits-coding distortion pairs every coding unit by using the undetermined multiplier thus calculated; and selecting a prediction mode and a quantization parameter used for the coding from the optimal number of coded bits-coding distortion pairs, wherein when the set of the secondary number of coded bits-coding distortion pairs is selected every coding unit, (1) a convex hull comprising the set of the primary number of coded bits-coding distortion pairs is formed on a two-dimensional orthogonal coordinate system in which the number of coded bits is set as one axis and the coding distortion is set as the other axis, (2) a set on the convex hull that connect the position of a number of coded bits-coding distortion pair providing the minimum number of coded bits and the position of a number of coded bits-coding distortion pair providing the minimum coding distortion is determined, and (3) a set of number of coded bits-coding distortion pairs that is on the convex hull and exists at a nearer side to the origin of the two-dimensional orthogonal coordinate system is selected as a set of the secondary number of coded bits-coding distortion pairs.

According to the embodiments of the invention, by forming the set of the secondary number of coded bits-coding distortion pairs for sequentially forming the convex hull, the prediction mode and the quantization parameter to be used for the coding can be determined from the optimal number of coded bits-coding distortion pairs while considering the overall computational complexity. Accordingly, the proper prediction mode and the quantization parameter are determined with a small computational complexity, whereby an image coding operation can be performed with high coding efficiency.

Furthermore, when a set of secondary number of coded bits-coding distortion pairs is selected, the set of the primary number of coded bits-coding distortion pairs located in the convex hull has a low probability to minimize the cost, and thus they are sequentially deleted from candidates, whereby the computational complexity is expected to be reduced without lowering the coding efficiency.

DETAILED DESCRIPTION OF THE INVENTION

Embodiments according to the invention will be described hereunder with reference to the accompanying drawings.

(1) Construction of Image Coding Device

Figure 1:
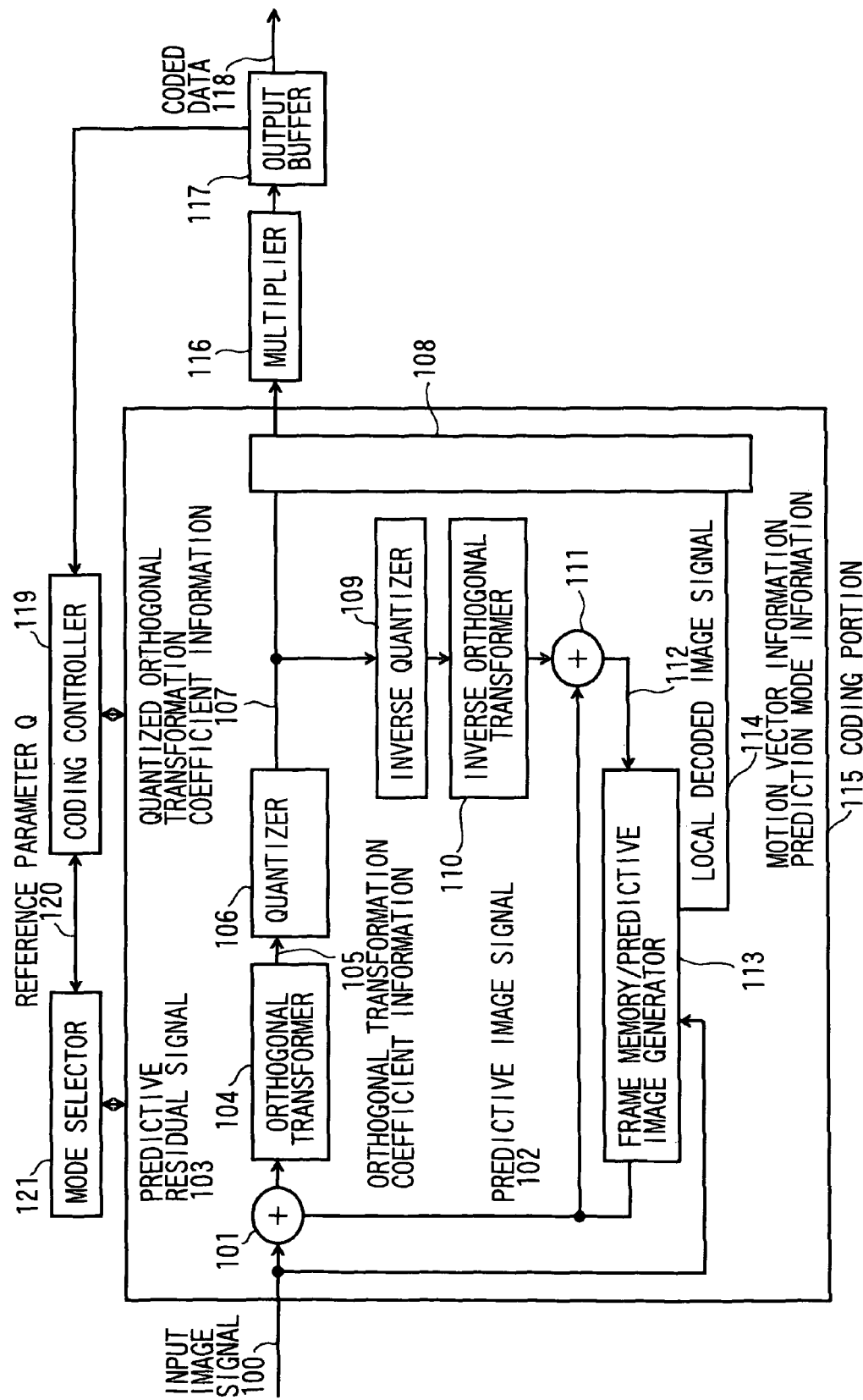
FIG. 1 is a block diagram showing the construction of an image coding device according to an embodiment of the invention.

FIG. 1 shows an image coding device for coding a motion picture according to an embodiment of the invention.

A motion picture signal is input as an image signal 100 to the image coding device on a frame basis.

The difference between an input image signal 100 and a predictive image signal 102 is taken by a subtractor 101 to generate a prediction error signal 103. On the prediction error signal 103 thus generated, orthogonal transformation, for example, discrete cosine transformation (DCT) is conducted by an orthogonal transformer 104. Orthogonal transformation coefficient information 105, for example, DCT coefficient information is achieved in the orthogonal transformer 104. The orthogonal transformation efficiency information 105 is quantized by a quantizer 106 to achieve quantized orthogonal transformation coefficient information 107. The quantized orthogonal transformation coefficient information 107 is input to both an entropy encoder 108 and an inverse quantizer 109.

The quantized orthogonal transformation coefficient information 107 input to the inverse quantizer 109 is successively subjected to the opposite processing to the processing of the quantizer 106 and the orthogonal transformer 104 by the inverse quantizer 109 and the inverse orthogonal transformer 110 to achieve a signal similar to the prediction error signal, and then the signal is added with the predictive image signal 102 in an adder 110, thereby generating a local decoded image signal 112. The local decoding image signal 112 is input to the frame memory/predictive image generator 108.

The frame memory/predictive image generator 113 generates the predictive image signal from the input image signal 100 and the local decoded image signal 112. The details of the frame memory/predictive image generator 113 will be described later.

In the entropy encoder 108, the quantized orthogonal transformation coefficient information 107 and motion vector information/prediction mode information 114 are subjected to entropy encoding. Respective codes thus generated are multiplexed by a multiplexer 116, and then smoothened by an output buffer 117.

The encoded data 118 output from the output buffer 117 are transmitted to a transmission system or accumulation system (not shown).

A mode selector 121 directly controls a switch in the frame memory/predictive image generator 113 to select a prediction mode, and also controls the quantization parameter. The details of the mode selector 121 will be described later.

A coding controller 119 controls a coding portion 115 containing elements from the subtractor 101 to the frame memory/predictive image generator 113. In this embodiment, a number of coded bits is allocated every coding unit while considering the buffer amount of the buffer 117. This embodiment uses a macroblock unit as the coding unit, for example, however, the invention is not limited to this mode.

(2) Frame Memory/Predictive Image Generator 113

Figure 2:
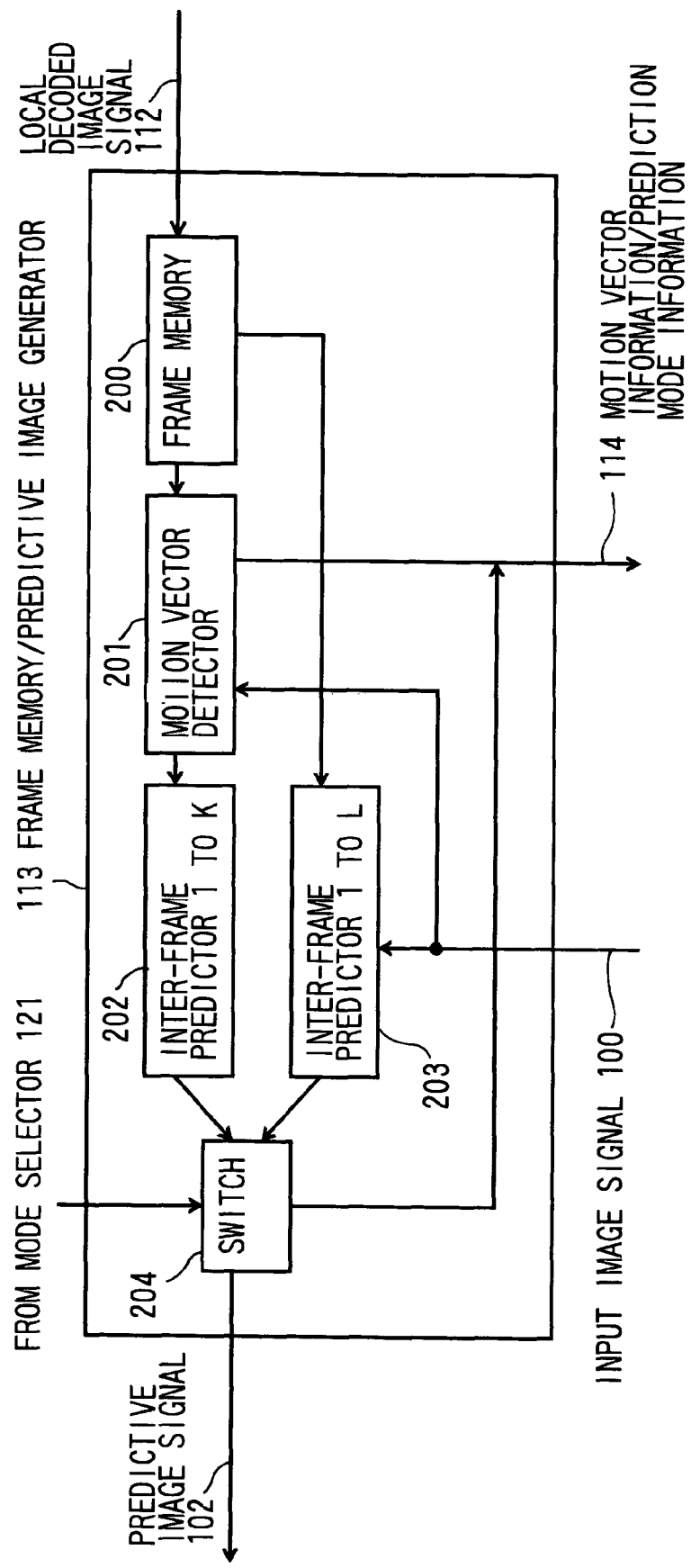
FIG. 2 is a block diagram showing the construction of a frame memory/predictive image creator in FIG. 1.

FIG. 2 shows a specific example of the frame memory/predictive image generator 113 for generating the predictive image signal 102 from the input image signal 100 and the local decoded image signal 112.

The local decoded image signal 112 from the adder 111 of FIG. 1 is temporarily accumulated in a frame memory 200.

A motion vector detector 201 carries out the matching (block matching) between the input image signal 100 and the local decoded image signal accumulated in the frame memory 200 every block in the frame to detect a motion vector.

An inter-frame predictor 202 subjects motion compensation to the local decoded image signal in the frame memory 200 on the basis of the motion vector detected in the motion vector detector 201 to generate a predictive image signal based on the inter-frame prediction.

On the other hand, a intra-frame predictor 203 generates a predictive image signal based on the intra-frame prediction from the input image signal 100 and the local decoded image signal of an area which has been already coded in a frame of the frame memory 200.

The inter-frame predictor 202 has inter-frame prediction modes of K (K represents an integer of two or more), and the intra-frame predictor 203 has intra-frame prediction modes of L (L represents an integer of two or more). A switch 204 is connected to the outputs of the inter-frame predictor 202 and the intra-frame predictor 203. The switch 204 is controlled by the mode selector 121, and outputs a predictive image signal based on a prediction mode selected from the inter-frame prediction modes of K or a predictive image signal based on a prediction mode selected from the intra-frame prediction modes of L.

The motion vector information output from the motion vector information/prediction mode 114, that is, the motion vector detector 201 and the prediction mode information indicating the prediction mode selected in the switch 204 by the mode selector 121 are transmitted to the entropy encoder 108. The motion vector information is output from the motion vector detector 201 only when the inter-frame prediction mode is selected.

(3) Coding Controller 119 and Mode Selector 121

Figure 3:
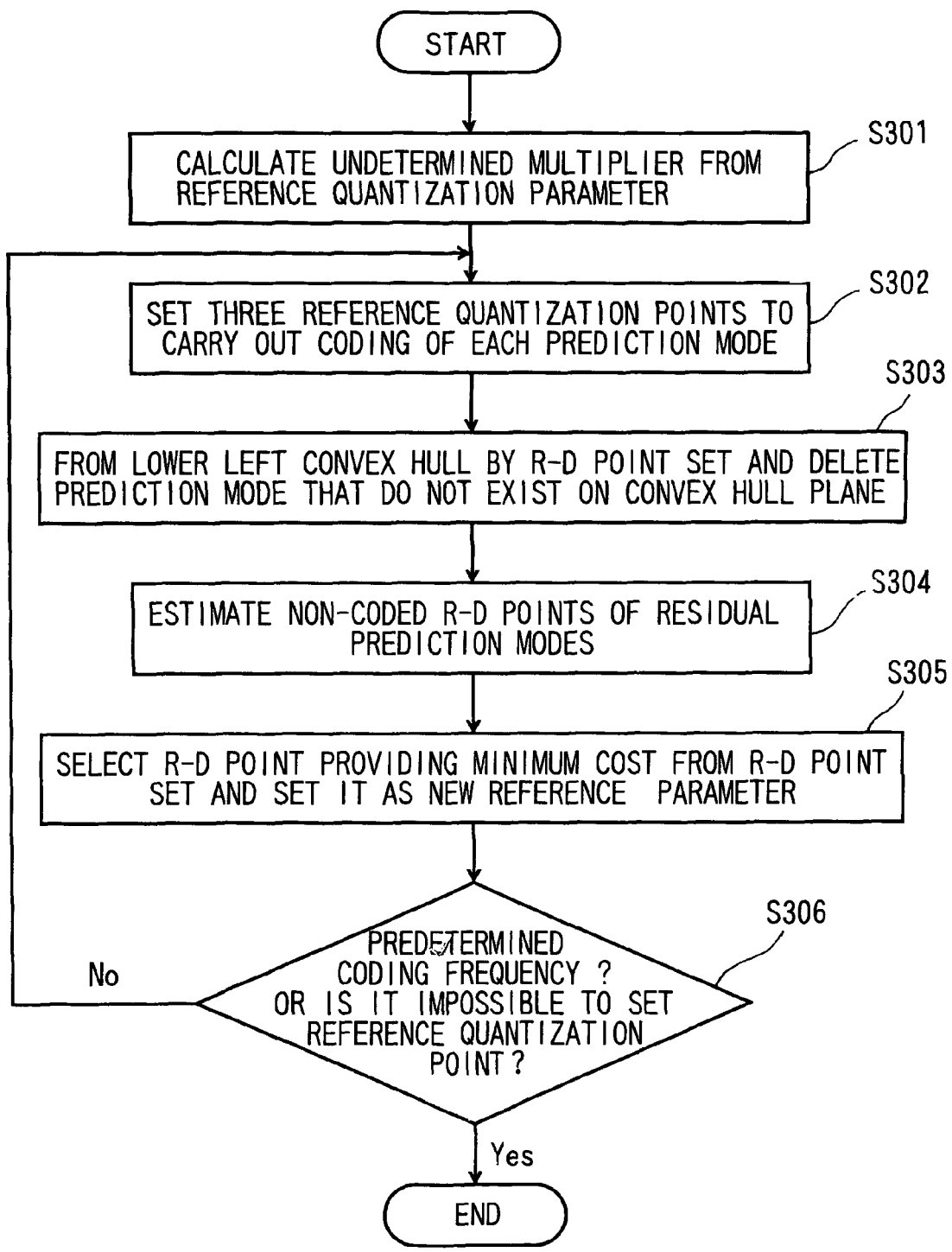
FIG. 3 is a flowchart showing the processing flow of a coding controller and a mode selector of FIG. 1.

FIG. 3 is a flowchart showing the flow of the operation of the coding controller 119 and the mode selector 121 in FIG. 1.

First, the coding controller 119 controls the coding portion 115 to successively carry out the coding operation in plural prediction modes (the inter-frame prediction modes of K and the intra-frame prediction modes of L) and also switch the quantization parameter in each prediction mode.

An undetermined multiplier λ is calculated from the reference quantization parameter $Q_0$ given from the coding controller 109 (step S301).

Subsequently, three reference quantization points are set to carry out the coding operation in each prediction mode, and a set of number of coded bits R-coding distortion D pairs (hereinafter referred to as "R-D point") is created (step S302).

A lower left convex hull set is formed by the R-D point set thus created, and a prediction mode which does not exist on the lower left convex hull plane is deleted (step S303). Here, the "lower left convex hull set" will be described. A convex hull is formed from an R-D point set existing on a two-dimensional orthogonal coordinate system in which the number of coded bits R is set to the abscissa axis and the coding distortion D is set to the ordinate axis. The lower left convex hull set is an R-D point set that exists on a convex hull connecting the position of the R-D point providing the minimum number of coded bits R in the convex hull and the position of the R-D point providing the minimum coding distortion D and also exists at a nearer side to the origin of the two-dimensional orthogonal coordinate system. The details will be described later.

An R-D point of a quantization parameter which is not coded in the residual R-D points is estimated (step S304).

An R-D point providing the minimum cost is selected from the R-D point set and set as a new reference quantization parameter (step S305).

When coding is carried out at a predetermined coding frequency or it is impossible to set the reference quantization point because coding has been already carried out, the processing is finished, and the prediction mode and the quantization parameter providing the minimum cost that are selected in the step S305 are output. If not so, the processing returns to step S302 to repeat the processing.

Next, specific examples of the processing of each of the steps S301 to S306 of FIG. 3 will be described.

[Step S301]

The undetermined multiplier λ is estimated from the reference quantization parameter $Q_0$ given from the coding controller 109 by using the following equation (1), for example.

$$\lambda = f \times \exp(gQ_0) \quad (1)$$

Here, f and g represent constants determined on the basis of the prediction structure of picture or slice, such as a picture type and a slice type.

[Step S302]

Figure 4:
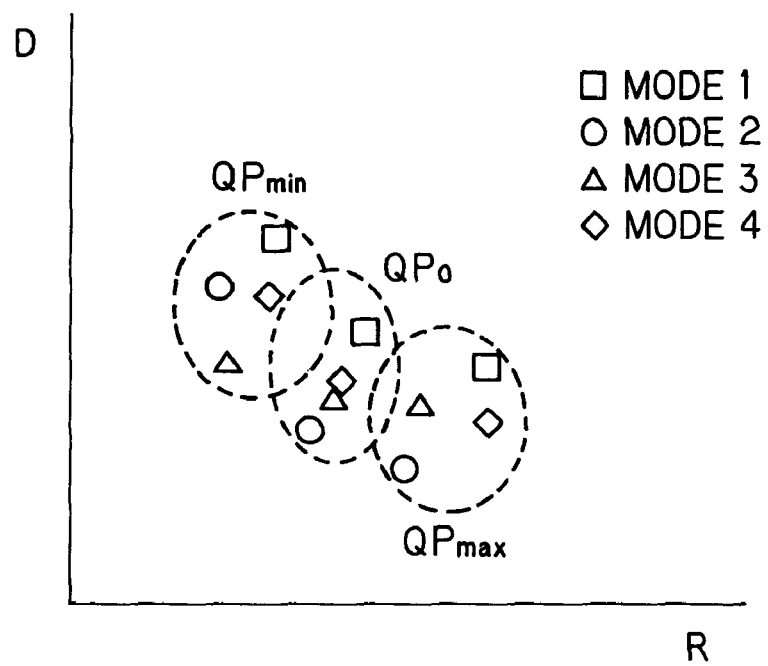
FIG. 4 is a diagram showing an R-D point that is encoded by a reference quantization parameter.

The coding is carried out on the basis of totally three quantization parameters, that is, the reference quantization parameter $Q_0$ given from the coding controller 109 and the two quantization parameters $Q_{min}$ and $Q_{max}$ before and after the value of the reference quantization parameter every prediction mode to determine a number of coded bits R and a coding distortion D (see FIG. 4).

Here, the coding distortion D is calculated on the basis of the square error between an input image signal (org) and a local decoded image signal (coded) of each of the brightness signal Y and the color difference signals Cb and Cr every macroblock.

$$D = \sum_{i=0}^{15}\sum_{j=0}^{15}(Y_{org}(i,j) - Y_{coded}(i,j)) + \sum_{i=0}^{7}\sum_{j=0}^{7}(Cb_{org}(i,j) - Cb_{coded}(i,j)) + \sum_{i=0}^{7}\sum_{j=0}^{7}(Cr_{org}(i,j) - Cr_{coded}(i,j)) \quad (2)$$

In place of the square errors of the brightness signal Y and the color difference signals Cb and Cr, the coding distortion may be the square error of only the bright signal, or any value such as an absolute value differential sum, a value weighted on the basis of a visual characteristic or the like insofar as it is a value representing the coding distortion.

[Step S303]

Subsequently, a lower left convex hull is formed by the R-D point set, and a prediction mode which does not exist on the convex hull plane is deleted.

Figure 10:
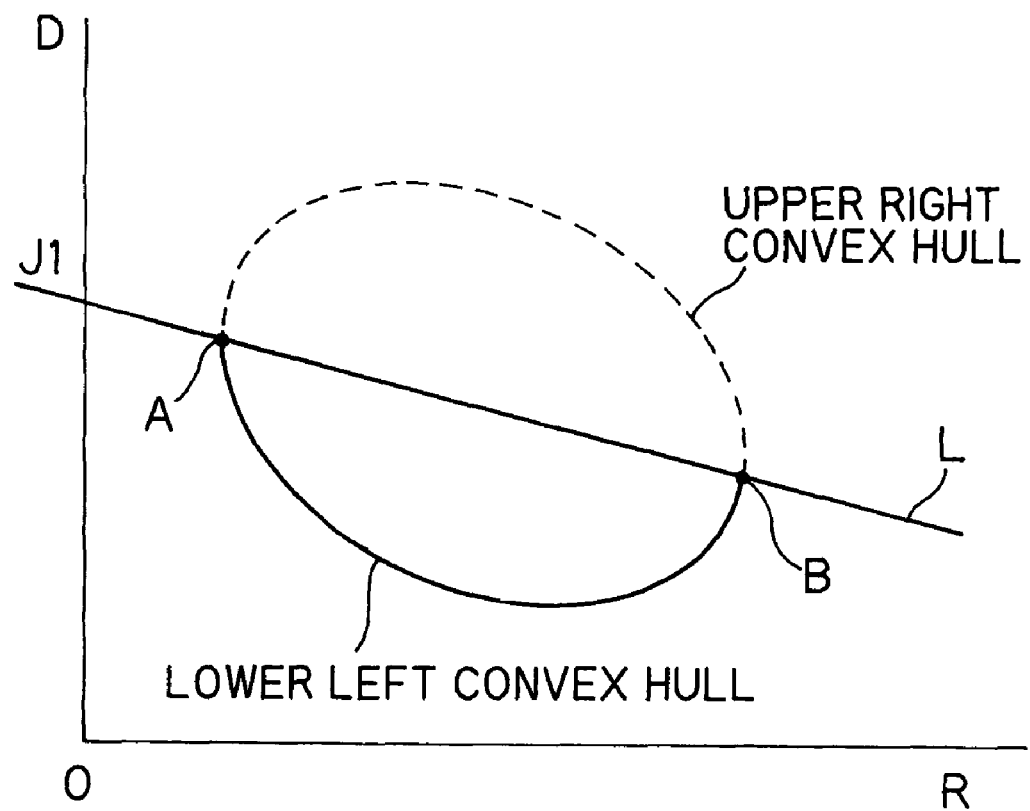
FIG. 10 is a diagram showing an R-D plane to explain a left convex hull.

The set of the lower left convex hull will be hereunder described on the R-D plane corresponding to the two-dimensional orthogonal coordinate system shown in FIG. 10 in which the number of coded bits R is set to the abscissa axis and the coding distortion D is set to the ordinate axis.

A convex hull comprising the set of the primary number of coded bits-coding distortion pairs is formed on the two-dimensional orthogonal coordinate system. This convex hull is a set having a shape nearer to a closed elliptical shape.

There is considered a set located on the convex hull connecting the position A of the number of coded bits-coding distortion pair providing the minimum number of coded bits R and the position B of the number of coded bits-coding distortion pair providing the minimum coding distortion D. Since the shape of the convex hull is nearer to the elliptical shape, two kinds of sets, that is, a set existing at a side nearer to the origin of the two-dimensional orthogonal coordinate system (the set of the lower left convex hull and it is indicated by a solid line of FIG. 10), and a set existing at a side farther from the origin (the set of the upper right convex hull and it is indicated by a dashed line) exist as the set on the convex hull.

Therefore, if the set of the number of coded bits-coding distortion pairs existing at the side near to the origin is a set of secondary number of coded bits-coding distortion pair, the set of the lower left convex hull could be selected.

The set existing at the side nearer to the origin will be further described while considering the cost function (J=D+λ·R) described later.

First, the position A of the minimum number of coded bits pair corresponding to the number of coded bits-coding distortion pair providing the minimum number of coded bits R in the convex hull is determined.

Subsequently, the position B of the minimum coding distortion pair corresponding to the number of coded bits-coding distortion pair providing the minimum coding distortion D in the convex hull is determined.

Next, a straight line L (J=D+λ·R) passing through the position A of the minimum number of coded bits pair and the position B of the minimum coding distortion pair thus determined is considered. When the gradient λ of the line L is represented by λ1 and the intercept J of the line L is represented by J1, the condition: J1≧J=D+λ1·R is satisfied at the lower side of the lower left convex hull. Accordingly, the set of the number of coded bits-coding distortion pairs at which the value Q of the cost function determined by the common undetermined multiplier λ1 corresponding to the above gradient is equal to or lower than the value of the minimum number of coded bits pair or the minimum coding distortion pair is set as the set of the secondary number of coded bits-coding pairs. This set corresponds to the set of the lower left convex hull.

Figure 5:
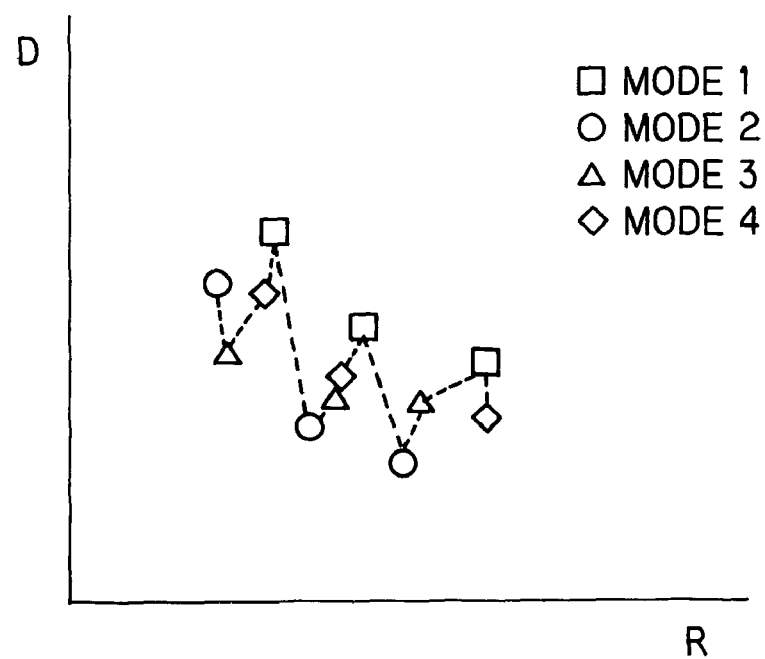
FIG. 5 is a diagram showing a specific example of a method of finding out a lower left convex hull to determine an R-D point set.
Figure 6:
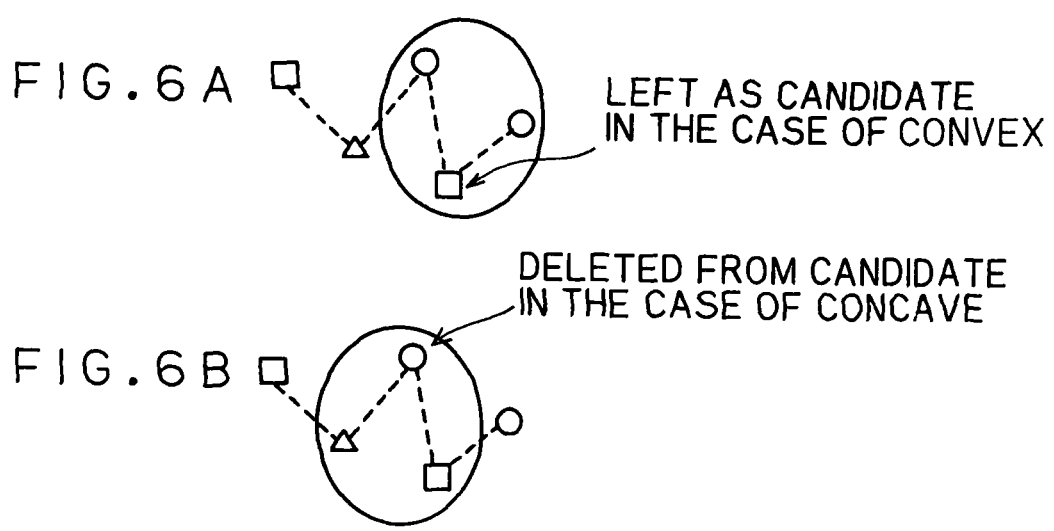
FIGS. 6A and 6B are diagrams showing a specific example of a method of finding out a lower left convex hull to determine the R-D point set.
Figure 7:
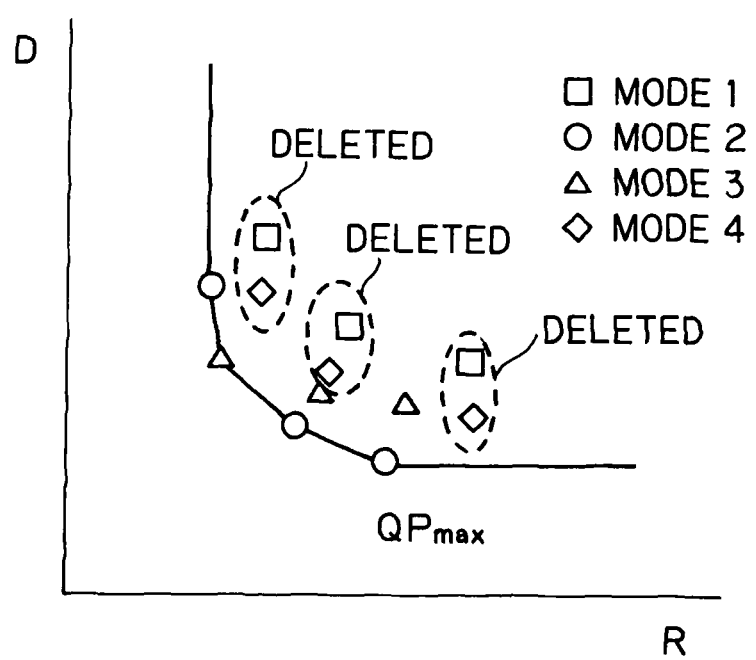
FIG. 7 is a diagram showing the processing of deleting a prediction mode that does not exist at the lower left convex hull in the R-D point set.

A method of finding out the lower left convex hull as shown in FIG. 7 will be described with reference to FIGS. 5 and 6.

First, the primary R-D point set is rearranged in an increasing or decreasing order with the value of the coding distortion D as a reference, for example. Actually, the coding distortion D of each prediction mode is increased as the quantization parameter is larger. Therefore, the rearrangement is unnecessary, and the primary R-D point set may be merged in increasing or decreasing order. FIG. 6 shows a case where the primary R-D points of FIG. 5 are ordered on the basis of the value of the coding distortion D, and the coding distortion D is increased in the connection order of the primary R-D points connected to one another by a broken line.

Next, as shown in FIGS. 6A and 6B, each point of the primary R-D point set is successively added with the next one point in the increasing order or decreasing order of the coding distortion D, and the shape of a broken line connecting the latest three points is checked. Here, if the shape of the broken line is a convex shape under the view from the lower left side as shown in FIG. 6A, the three points are left as points of the secondary R-D point set, and the next point is added. On the other hand, if the shape of the broken line is a concave shape under the view from the lower side as shown in FIG. 6B, the point in the middle of the three points is deleted.

The processing as described above is carried out on all the points of the R-D point set, and the residual R-D points at the time when the processing concerned is finished are set as a lower left convex hull plane set. By checking the shape of the broken line at the frequency corresponding to the number of all the points, it can be judged whether the processing on all the points of the R-D point set is finished.

At this time, with respect to prediction modes which never belong to the lower left convex hull plane set, they are deleted from the subsequent candidates of the prediction modes. Specifically, a mode 1 and a mode 4 shown in FIG. 7 never belong to the lower left convex hull plane set, and thus they are deleted from the candidates at this time point.

[Step S304]

Figure 8:
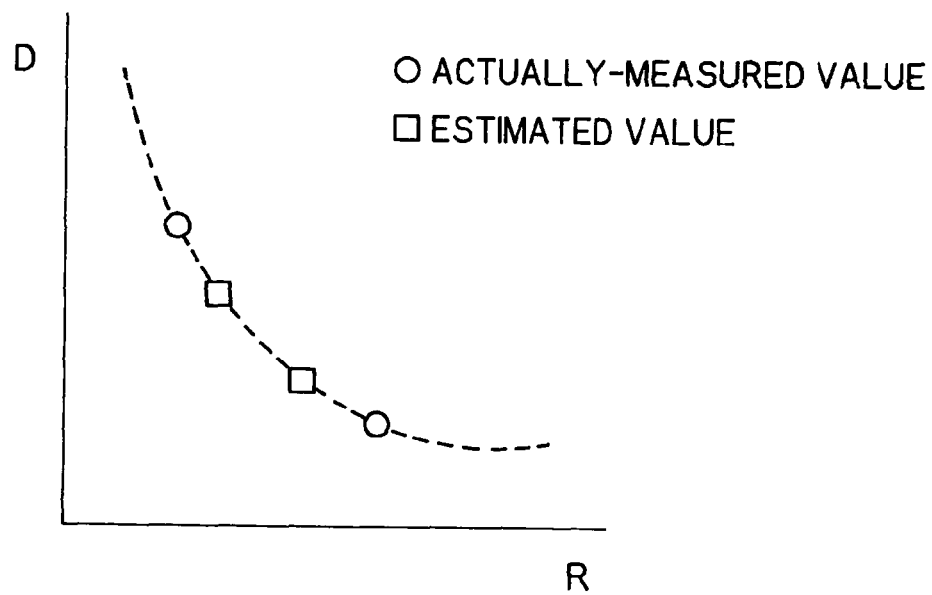
FIG. 8 is a diagram showing a process of estimating a number of coded bits and a coding distortion from actually-measured values.

Subsequently, with respect to the residual prediction modes, the number of coded bits R and coding distortion D of a quantization parameter which has not been coded are estimated from the points of the actually coded quantization parameter before and after the non-coded quantization parameter concerned as shown in FIG. 8. It is assumed that the number of coded bits R and the coding distortion D satisfy the relationship shown by the equations (3) and (4) with the quantization parameter represented by Q. In the following equations, a, b, c, d represents coefficients.

$$\log R = aQ + b \tag{3}$$

$$\log D = cQ + d \tag{4}$$

The coefficients a, b, c, d assumed in the equations (3) and (4) are estimated from the following equations (5) to (8) by using the numbers of coded bits R1, R2 and the coding distortions D1, D2 of the actually-coded two points before and after the non-coded quantization parameter.

$$a = \frac{\log R_2 - \log R_1}{Q_2 - Q_1} \tag{5}$$

$$b = \frac{Q_2 \log R_1 - Q_1 \log R_2}{Q_2 - Q_1} \tag{6}$$

$$c = \frac{\log D_2 - \log D_1}{Q_2 - Q_1} \tag{7}$$

$$d = \frac{Q_2 \log D_1 - Q_1 \log D_2}{Q_2 - Q_1} \tag{8}$$

From these coefficients a, b, c, d, the number of coded bits R and the coding distortion D of each quantization parameter which skip some values are estimated from the four coefficients a, b, c, d according to the following equations (9) and (10).

$$\hat{R}(Q) = \exp(aQ + b) \tag{9}$$

$$\hat{D}(Q) = \exp(cQ + d) \tag{10}$$

Referring to FIG. 8, white circular points represent actually measured values, and white rectangular points represent estimation values estimated in the above step. The points thus estimated are also added to the R-D point set.

[Step S305]

Subsequently, the R-D point providing the minimum cost is selected from the R-D point set. Here, the cost calculation of each point is carried out according to the cost function of the equation (11). λ represents the undetermined multiplier determined in the step S301.

$$J = D + \lambda R \tag{11}$$

Figure 9:
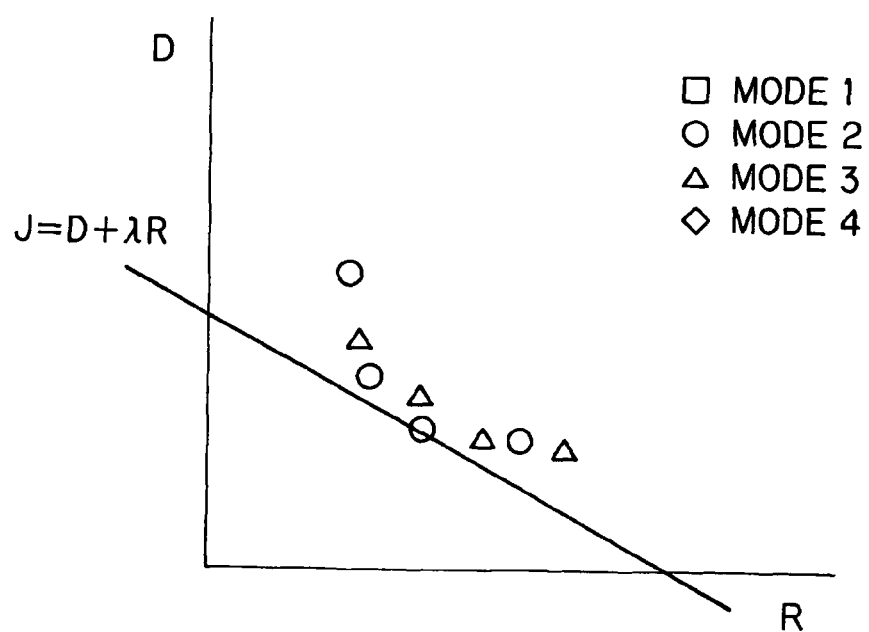
FIG. 9 is a diagram showing a process of selecting an R-D point having the minimum cost from the R-D point set.

The quantization parameter of the point providing the minimum cost in the R-D point set as shown in FIG. 9 is set as a new reference quantization parameter $Q_0$.

[Step S306]

In this case, when the coding frequency for the R-D point calculation exceeds a predetermined frequency, or when the new reference quantization parameter corresponding to a point which has been already coded, it is judged that the condition is satisfied, the processing is finished, and the quantization parameter and the prediction mode of the point selected in step S305 are output.

If the condition is not satisfied, the processing returns to step S302, and the processing of steps S302 to S306 is repeated until the above condition is satisfied.

(4) Modification

In the above embodiment, the macroblock is set as the coding unit, and a pair of prediction mode and quantization parameter is determined at every macroblocks. However, the coding unit may be set to plural macroblocks, or it may be set to another unit such as slice, field, frame, picture or GOP.

Furthermore, the above embodiment has been described by taking the motion picture coding as an example. However, the invention may be applied to still picture coding.

What is claimed is:

1. An image coding control method for controlling a quantization parameter by using a prediction mode selected from plural prediction modes every any coding unit, comprising:
   calculating an undetermined multiplier serving as a parameter used for a cost function from a given reference quantization parameter;
   selecting a set of secondary number of coded bits-coding distortion pairs from a set of primary number of coded bits-coding distortion pairs that correspond to plural combinations of the prediction mode and the quantization parameter every coding unit;
   selecting number of coded bits-coding distortion pairs providing the minimum cost function as the optimal number of coded bits-coding distortion pairs from the set of the secondary number of coded bits-coding distortion pairs by using the undetermined multiplier thus calculated every coding unit; and
   determining a prediction mode and a quantization parameter used for the coding from the optimal number of coded bits-coding distortion pairs,
   wherein when the set of the secondary number of coded bits-coding distortion pairs is selected every coding unit,
   (1) a convex hull comprising the set of the primary number of coded bits-coding distortion pairs is formed on a two-dimensional orthogonal coordinate system in which the number of coded bits is set as one axis and the coding distortion is set as the other axis,
   (2) a set on the convex hull that connect the position of a number of bits-coding distortion pair providing the minimum number of coded bits and the position of a number of coded bits-coding distortion pair providing the minimum coding distortion is determined, and
   (3) a set of number of coded bits-coding distortion pairs that is on the convex hull and exists at a nearer side to the origin of the two-dimensional orthogonal coordinate system is selected as a set of the secondary number of coded bits-coding distortion pairs.

2. The image coding control method according to claim 1, wherein when the set of the secondary number of coded bits-coding distortion pairs is selected every coding unit,
   (1) a minimum number of coded bits pair corresponding to the number of coded bits-coding distortion pair providing the minimum number of coded bits is determined,
   (2) a minimum coding distortion pair corresponding to the number of coded bits-coding distortion pair providing the minimum coding distortion is determined;
   (3) a convex hull comprising the set of the primary number of coded bits-coding distortion pairs on a two-dimensional orthogonal coordinate system in which the number of coded bits is set to one axis and the coding distortion is set to the other axis is determined,
   (4) the value of a cost function determined by a common undetermined multiplier between the minimum number of coded bits pair and the minimum coding distortion pair and existing on the convex hull is calculated,
   (5) it is judged whether the value of the cost function is not more than the value in the minimum number of coded bits pair or the minimum coding distortion pair, and
   (6) a set of the number of coded bits-coding distortion pairs in which the value of the cost function is not more than the value concerned is selected as a set of secondary number of coded bits-coding distortion pairs.

3. The image coding control method according to claim 1, wherein when the set of the secondary number of coded bits-coding distortion pairs is selected every coding unit, the set of the primary number of coded bits-coding distortion pairs located in the convex hull is deleted from the candidate of the set of the secondary number of coded bit-coding distortion pairs.

4. The image coding control method according to claim 1, wherein the coding unit is set to a macroblock unit, a unit of plural macroblocks, a slice unit, a field unit, a frame unit, a picture unit or GOP unit.

5. An image coding control device for controlling a quantization parameter by using a prediction mode selected from plural prediction modes every any coding unit, comprising:
   an undetermined multiplier calculating processor unit for calculating an undetermined multiplier serving as a parameter used for a cost function from a given reference quantization parameter;
   a set selecting processor unit for selecting a set of secondary number of coded bits-coding distortion pairs from a set of primary number of coded bits-coding distortion pairs that correspond to plural combinations of the prediction mode and the quantization parameter every coding unit;
   an optimal set selecting processor unit for selecting number of coded bits-coding distortion pairs providing the minimum cost function as the optimal number of coded bits-coding distortion pairs from the set of the secondary number of coded bits-coding distortion pairs by using the undetermined multiplier thus calculated every coding unit; and
   a determining processor unit for determining a prediction mode and a quantization parameter used for the coding from the optimal number of coded bits-coding distortion pairs,
   wherein when the set of the secondary number of coded bits-coding distortion pairs is selected every coding unit, the set selecting processor unit
   (1) forms a convex hull comprising the set of the primary number of coded bits-coding distortion pairs on a two-dimensional orthogonal coordinate system in which the number of coded bits is set as one axis and the coding distortion is set as the other axis,
   (2) determines a set on the convex hull that connect the position of a number of coded bits-coding distortion pair providing the minimum number of coded bits and the position of a number of coded bits-coding distortion pair providing the minimum coding distortion, and
   (3) selects a set of number of coded bits-coding distortion pairs that is on the convex hull and exists at a nearer side to the origin of a two-dimensional orthogonal coordinate system, as a set of the secondary number of coded bits-coding distortion pairs.

6. The image coding control device according to claim 5, wherein when the set of the secondary number of coded bits-coding distortion pairs is selected every coding unit, the set selecting processor unit
   (1) determines a minimum number of coded bits pair corresponding to the number of coded bits-coding distortion pair providing the minimum number of coded bits,
   (2) determines a minimum coding distortion pair corresponding to the number of coded bits-coding distortion pair providing the minimum coding distortion;
   (3) determines a convex hull comprising the set of the primary number of coded bits-coding distortion pairs on a two-dimensional orthogonal coordinate system in which the number of coded bits is set to one axis and the coding distortion is set to the other axis, (4) calculates the value of a cost function determined by a common undetermined multiplier between the minimum number of coded bits pair and the minimum coding distortion pair and existing on the convex hull, (5) judges whether the value of the cost function is not more than the value in the minimum number of coded bits pair or the minimum coding distortion pair, and (6) selects a set of the number of coded bits-coding distortion pairs in which the value of the cost function is not more than the value concerned, as a set of secondary number of coded bits-coding distortion pairs.

7. The image coding control device according to claim 5, wherein the set of the primary number of coded bits-coding distortion pairs located in the convex hull is deleted from the candidate of the set of the secondary number of coded bits-coding distortion pairs.

8. The image coding control device according to claim 5, wherein the coding unit is set to a macroblock unit, a unit of plural macroblocks, a slice unit, a field unit, a frame unit, a picture unit or GOP unit.

* * * * *